(12) United States Patent
Zimmerman et al.

(10) Patent No.: US 6,204,634 B1
(45) Date of Patent: Mar. 20, 2001

(54) ADAPTIVE CHARGING METHOD FOR LITHIUM-ION BATTERY CELLS

(75) Inventors: Albert H. Zimmerman, Torrance; Michael V. Quinzio, Santa Monica, both of CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 09/603,209

(22) Filed: Jun. 26, 2000

(51) Int. Cl.$^7$ .................................. H01M 10/44
(52) U.S. Cl. .................. 320/128; 320/162; 320/164
(58) Field of Search ..................... 320/124, 125, 320/127, 128, 137, 152, 157, 158, 159, 160, 162, 164

(56) References Cited

U.S. PATENT DOCUMENTS 4,709,202 * 11/1987 Koenck et al. .
5,561,360 * 10/1996 Ayres et al. .

* cited by examiner

Primary Examiner—Edward H. Tso
(74) Attorney, Agent, or Firm—Derrick Michael Reid

(57) ABSTRACT

A charging and discharging method for lithium-ion and lithium-polymer batteries determines overcharged, undercharged, normal and degraded operating conditions and adjusts a recharge fraction of recharge capacity to discharge capacity for improving battery life while maintaining the battery cells at a high charge state.

11 Claims, 2 Drawing Sheets

ADAPTIVE CHARGE CONTROL ALGORITHM

BATTERY VOLTAGE CYCLES

ADAPTIVE CHARGING METHOD FOR LITHIUM-ION BATTERY CELLS

FIELD OF THE INVENTION

The invention relates to the field of batteries and electrical storage devices. More particularly, the present invention relates to optimum charging of battery cells.

BACKGROUND OF THE INVENTION

Existing charge control systems for lithium-ion or lithium polymer battery cells typically utilize voltage-limited constant current charging of individual cells to maintain an adequate battery charge while also limiting cell degradation rates. This kind of a charge control system, while adequate for commercial applications that do not have large cycle life requirements, is not capable of optimizing the cycle life capability of lithium-ion and lithium polymer battery cells. Ultimate cycle life has a strong inverse correlation with the cumulative amount of overcharge put into the cells by the charge control system. The optimum cycle life is achieved when unnecessary overcharge is exactly zero. In addition, degradation rates can change significantly as the electrodes transition among several charge states. Also, the recharge voltage limit shifts as the cell temperature changes and as the cells degrade over life. Charge control devices or algorithms that automatically optimize the recharge process and that adapt to changes in the environment or to internal cell degradation are not presently available for lithium-ion and lithium polymer battery cells. These and other disadvantages are solved or reduced using the invention.

SUMMARY OF THE INVENTION

An object of the invention is to provide a method for adaptively charging battery cells.

Another object of the invention is to provide a method for adaptively charging battery having time varying charge capacities.

Yet another object of the invention is to provide a method for adaptively charging of lithium ion battery cells that have time averaging charge capacities.

A further object of the invention is to provide a method for adaptively charging battery cells by adjusting a recharge fraction parameter that is the amount of charging divided by the amount of discharging over a charging cycle.

The present invention provides an algorithm that meters the correct amount of recharge into a battery cell such as a lithium-ion or a lithium-polymer battery cell, to optimize cycle life, while maintaining the cell at a high state-of-charge. The algorithm automatically adapts to any changes in the thermal environment or any internal cell degradation to maintain the minimum stress condition needed to optimize cycle life. Subtle adaptive changes in the charge control parameters provide an order of magnitude variation in cycle life.

The adaptive algorithm eliminates unnecessary overcharging by metering a charge into each cell and exactly balances the input charge capacity to the discharged capacity. This balance point is adaptively maintained over repetitive cycling by adaptively changing the control parameters reducing cell degradation. Capacity degradation relates to the cell charge and discharge voltages. The adaptive algorithm uses a plurality of control parameters to adaptively adjust the recharge fraction. For example, a low discharge voltage due to capacity degradation is compensated by a slight upward adjustment to the charge into the cell during recharge. This assures minimum degradation rates while keeping each cell at the maximum state-of-charge consistent with optimum cycle life. The recharge algorithm firstly locates the optimum charge control point for each cell in a battery, and secondly adapts the charge control parameters as the cell degrades or the thermal environment changes so as to maintain the optimum condition for best cycle life. These and other advantages will become more apparent from the following detailed description of the preferred embodiment.

DETAILED DESCRIPTION OF THE PREFERRED EMBODIMENT

Figure 1:
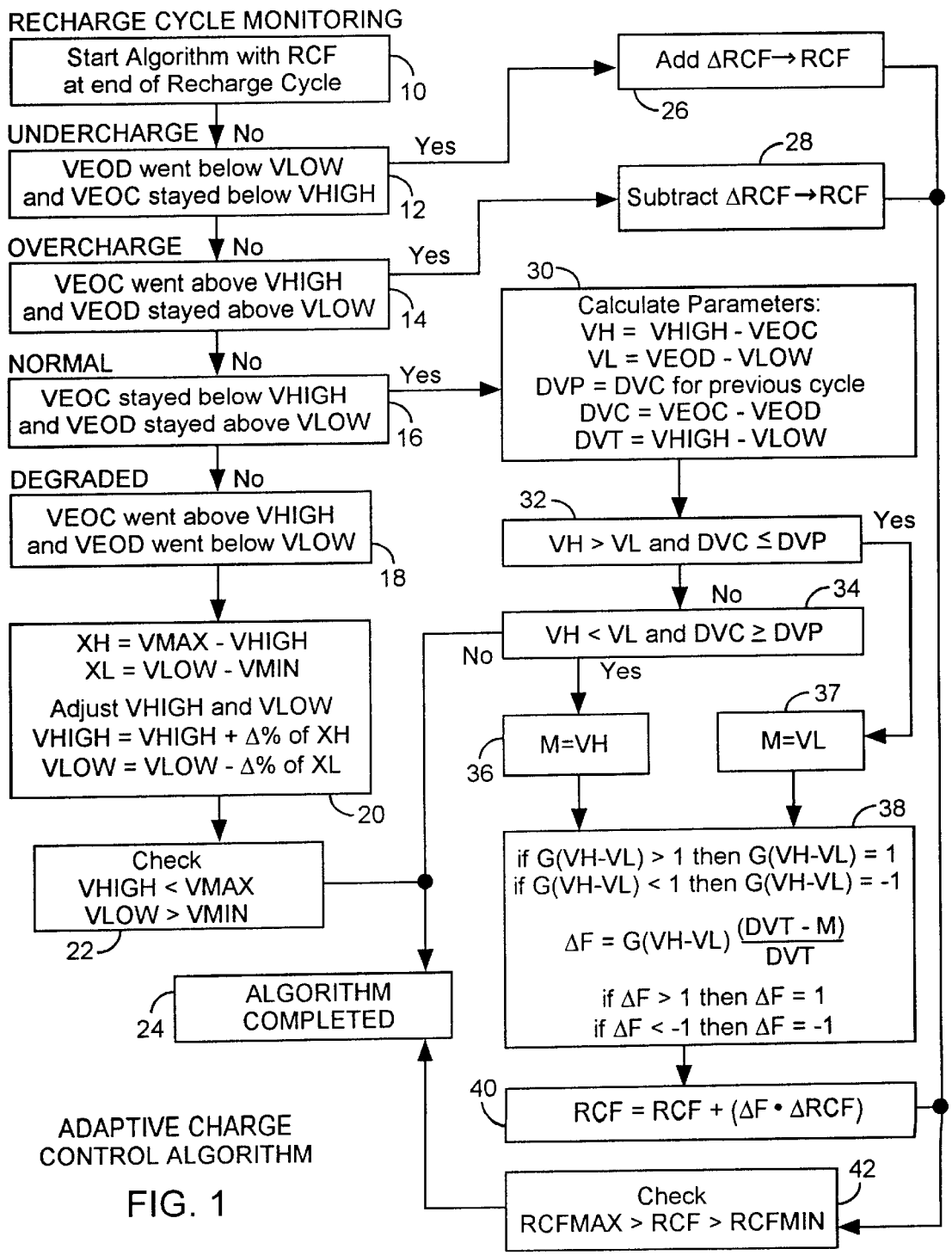
FIG. 1 is a graph of charge cycles of a battery.
Figure 2:
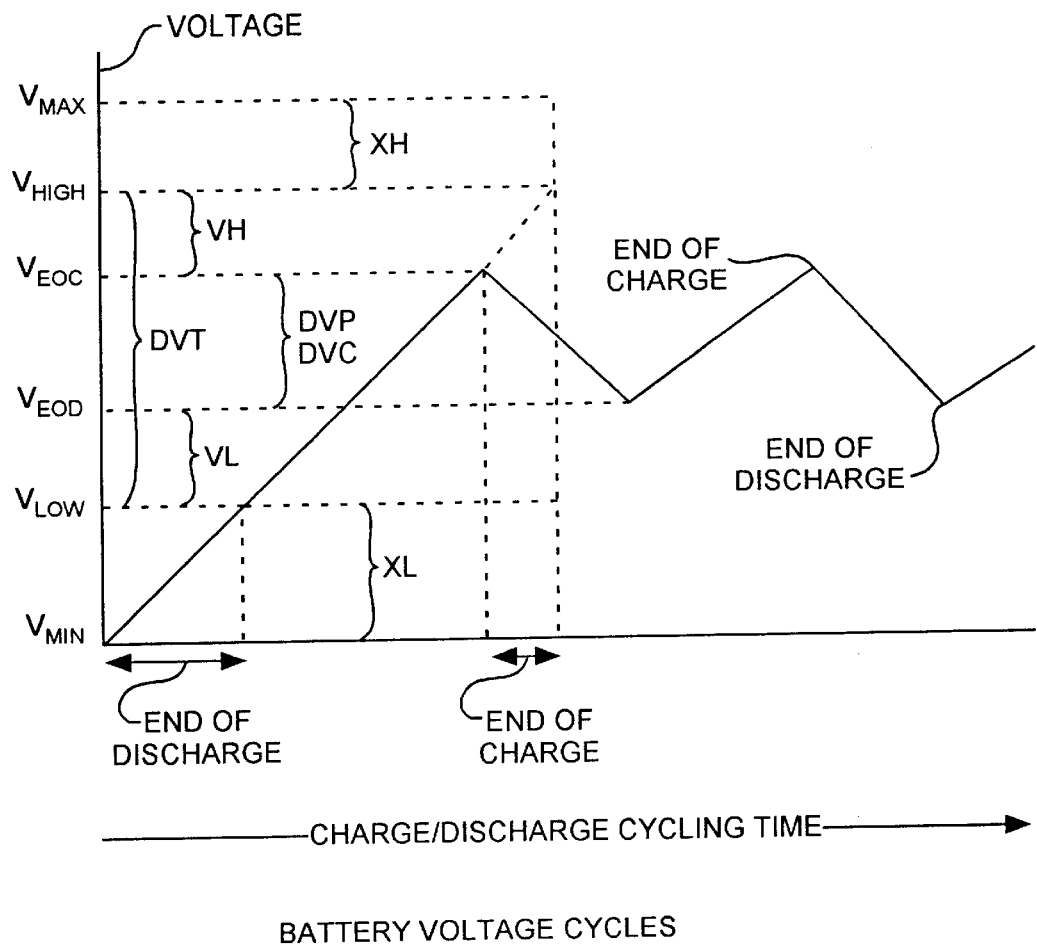
FIG. 2 is an flow diagram of a battery charge algorithm.

An embodiment of the invention is described with reference to the Figures using reference designations as shown in the Figures. Referring to the Figures, an adaptive charge control algorithm is based on the recognition that a full recharge fraction will provide the optimum cycle life for lithium Ion and lithium polymer battery cells. A full recharge fraction is when the battery is fully recharged to the extent of a prior discharge. This adaptive charge control algorithm provides small adjustments to the optimum recharged fraction to correct for measurement errors and self-discharge, based on high and low voltage trigger levels. The battery cell charge control parameters that are measured are the cell voltage, cell charge current, cell discharge current, charge time and discharge time.

The adaptive charge control parameters are used to implement the adaptive charge control algorithm.

A recharge fraction (RCF) is equal to the ratio of the recharge capacity in Amp-hours during recharge divided by discharge capacity in Amp-hours during discharge.

The recharge capacity is a product of cell charge current and cell charge time. The discharge capacity is a product of the cell discharge current and the cell discharge time.

A recharge fraction adjustment $\Delta$RCF is the maximum amount of change to the recharge fraction that can occur from one cycle to the next and is typically a small value.

A recharge fraction adjustment portion $\Delta$F is a portion of the maximum recharge fraction adjustment $\Delta$RCF that is applied to adjust the recharge fraction from one cycle to the next.

A maximum recharge fraction RCFMax is the maximum value permitted for the recharge fraction RCF.

A minimum recharge fraction RCFMin is the minimum value permitted for the recharge fraction RCF.

A low voltage trigger level VLow triggers adjustment to VLow on the next charging cycle, triggers adjustments to the RCF for the next charging cycle, and generally indicates capacity degradation.

A high voltage trigger level VHigh triggers adjustments to VHigh on the next charge cycle, triggers adjustments to the RCF for the charging cycle, and generally indicates an overcharge or degradation condition.

An end of charge voltage $V_{EOC}$ is the maximum cell voltage during the charge portion of the charge cycle and is typically at a maximum at the end of charge.

An end of discharge, voltage VEOD is the minimum cell voltage during the discharge portion of the charge cycle and is typically at a minimum at the end of discharge of a charge cycle.

A maximum cell voltage VMax is the maximum voltage that the cell is permitted to reach at any time during a charge cycle.

A minimum cell voltage VMin is the minimum cell voltage that the cell is permitted to reach at any time during a charge cycle.

A high voltage margin XH is the difference between VMax and VHigh and is the margin between the maximum permitted voltage VMax and the current operating high voltage trigger point VHigh.

A low voltage margin XL is the difference between VMin and VLow and is the margin between the minimum permitted voltage VMin the current operating low voltage trigger point VLow.

A high trigger margin VH is the difference between the maximum charge voltage VEOC and the high trigger voltage VHigh and is used to determine the amount of the recharge fraction adjustment ΔRCF.

A low trigger margin VL is the difference between the minimum discharge voltage VEOD and the low trigger voltage ΔLow and is used to determine the amount of the recharge fraction adjustment ΔRCF.

The voltage trigger range DVT is the difference between the high trigger level VHIGH and the low trigger level VLOW and is used to compute changes to the recharge fraction.

A trigger level adjustment Δ% is the amount of change to the high voltage margin XH and the low voltage margin XL for respectively adjusting the high trigger level VHigh and the low trigger level VLow for the next charge cycle.

The previous voltage charging range DVP is the charging and discharging range of the previous charging cycle and is equal to the end of charge voltage VEOC minus the end of discharge voltage VEOD for the previous charging cycle.

The current voltage charging range DVC is the charging and discharging voltage range of the current time wise charging cycle and is equal to VEOC minus VEOD for the current time wise charging cycle.

The gain G is a scalar used for computing the recharge fraction adjustment, and is used to determine how much the recharge fraction adjustment changes due to changes in the voltage charge range position DVQ.

The adaptive charge control algorithm uses the charge control parameters to adaptive recharge and discharge the cell. The recharge fraction being a key recharge parameter. The algorithm starts for any one particular battery cell and is repeated for all of the cells in a battery. The algorithm starts 10 with a predetermined recharge fraction. During each recharge cycle, discharging and recharging battery current and voltages are monitored. At the end of each charge cycle the method adjusts the RCF to maintain optimum charge control in response to cell operating changes.

At initiation 10, cell voltages and current are monitored during a current recharge cycle during which the cell is recharged to VEOC and then discharged to VEOD. The amount of recharge is a recharge fraction of the amount of capacity that was discharged during the previous recharge cycle with VLow and VHigh setting charge trigger margins. Initially, the recharge fraction is set to a full recharge fraction with VLow and VHigh margins set to a predetermined value between VMax and VMin.

The recharge algorithm is characterized by four operating conditions, undercharge 12, overcharge 14, normal 16 and degraded 18. In the undercharge condition, VEOC is below VHigh and VEOD is below VLow. The battery cell is undercharged 12 during the recharge cycle when the battery voltage is too low by being below VLow. In the overcharge condition 14, VEOC is above VHigh and VEOD is above VLow. The battery cell is overcharged 12 during the recharge cycle when the battery voltage went too low by being below VLow. In the normal operating condition 16, the VEOC is below VHigh and VEOD is above VLow. The battery cell is operating normally 16 during the recharge cycle when the battery voltage went neither too high by being below VHigh nor too low by being above VLow. In the degraded condition 18, VEOC is above VHigh and VEOD is below VLow. The battery cell is degraded during the recharge cycle when the battery voltage went too high by being above VHigh and went too low by being below VLow.

When the battery cell degraded 18, the XH and XL margins are computed 18 and the VHigh and VLow triggers are adjusted 20. The VHigh trigger is adjusted to VHigh plus Δ%VHigh. The VLow trigger is adjusted to VLow minus Δ%VLow. The adjustments to the VHigh and VLow triggers serves to increase the operating recharge and discharge trigger levels in the presence of degradation of the battery cell. The Δ% is preferably a predetermined ΔV voltage incremental value or percentage, for example, Δ% may be 2 mv. The XH and XL margins are compared 22 to verify that VHigh is below VMax and VLOW is greater than VMin so that the battery recharged VEOC voltage and discharge VEOD voltage are within the maximum and minimum allowable voltages VMax and Vmin. After comparison, the algorithm is completed 24 in advance of the next recharge cycle 10.

In the degraded condition 18, the algorithm may be further modified to enable differing values of Δ% applied to the adjustment of VHigh and VLow. For example, when in the degraded condition, and when VHigh is less than 3.9 volts, VHigh is increased by Δ%, which may be 10 mv with no change to VLOW. When VHigh is between 3.9V to 4.1V, VHigh is increased 5 mv and VLOW is decreased 5 mv. When VHigh is greater than 4.1V, there is no change to VHigh and VLow is decreased by 10 mv. In this manner, the degradation adjustments Δ% are variable values, and can depend, for example, on the present value of VHigh.

In the undercharge condition 12, the recharge fraction RCF is increase 26 by the recharge fraction adjustment ΔRCF. In the overcharged condition, RCF is decreased by ΔRCF. The recharge fraction adjustment may be a predetermined voltage value or percentage, for example, the recharge fraction adjustment may be 0.02%. Additionally, the algorithms may be modified to not apply the recharge fraction adjustment ΔRCF 26 when in the undercharged condition 12 when VEOC has dropped Δ% since the last recharge cycle, or not apply the recharge fraction adjustment ΔRCF 28 when in the overcharged condition 12 when VEOD has increased Δ% since the last discharge cycle. The adjustments ΔRCF to the recharge fraction RCF is used to reduce recharging 28 when in the overcharged condition 14 and to increase charging 26 when in the undercharge condition 12.

When in the normal operating condition 16, the algorithm serves to center the current charging range DVC between the trigger levels VHigh and VLow by making adjustments to the recharge fraction. The parameters VH, VL, DVC, and DVT are computed 30 with DVP being the charging range of the previous recharge cycle. When VH greater than VL and DVC is less than or equal to DCP 32, the margin M is set 37 to VL. This indicates that charging range is decreasing, that the charging range is not centered, that the low margin VL is the lesser of the two margins, and that the center position of the charging range is decreasing. When VH is lesser than VL and DVC is greater than or equal to DCP 34, the margin M is set 36 to VH. This indicates that the charging range is increasing, that the charging range is not centered, that the high margin VH is the lesser of the two margins VH and VL, and that the center position of the charging range is increasing. When neither of these two conditions are met, the algorithm terminates 24 without adjusting the recharge fraction RCF to center the charging range for the next cycle between the trigger level VHigh and VLow.

In either case of increasing or decreasing charging range in the respective presence of an increasing VL or decreasing VH, the recharge fraction adjustment portion ΔF is computed 38 for adjusting the recharge fraction RCF 40 serving to respectively decrease or increase the voltage charging so as to recenter the voltage charging range between the VHigh and VLow triggers. The recharge fraction adjustment portion is equal to the product of two terms. The first term is gain G times the difference between the high and low margins, which provides for a margin differential portion (VH-VL). The margin differential portion is limited to +1 when exceeding a +1 value and limited to -1 when succeeding a -1 value. The second term is the charge range minus the less margin M with this result divided by the charge range indicating an available charging range. Hence, the recharge adjustment portion AF is a product of the margin differential portion and the available charging range. The recharge adjustment portion ΔF is also limited to a +1 value when exceeding +1 and limited to a -1 value when succeeding -1. The computed 38 recharge fraction portion ΔF is used to adjust 40 the recharge fraction RCF by the recharge fraction adjustment portion ΔF multiplied by the recharge fraction adjustment ΔRCF. After adjustment of the RCF 40, a check 42 is made to limit the values of the RCF between RCFMax and RCFmin.

As may now be apparent, the algorithm increases the RCF in the presence of an undercharge condition 12 to increase the VEOD, decreases the RCF in the presence of an overcharge condition 14 to decrease the VEOC, increases or decreases the RCF to center the charging range in the presence of a normal condition 16, and increases the high margin VH and decreases the low margin VL to increase the charging range in the presence of a degraded condition. The algorithm serves to adaptively maintain the charge of the battery cell over the operating conditions. The algorithm is preferably applied to battery cells for which long battery cycle life is critical, such as for low-earth-orbit satellite applications where long cycle battery life is critical. Those skilled in the art can make enhancements, improvements, and modifications to the invention, and these enhancements, improvements, and modifications may nonetheless fall within the spirit and scope of the following claims.

What is claimed is:

1. A charging method for charging and discharging a battery cell during recharge cycles, the method comprising the steps of monitoring the battery cell during a recharge cycle for determining an end of charge voltage (VEOC) during recharging of the battery cell and an end of discharge voltage (VEOD) during the discharging of the battery cell, the recharge cycle serving to charge the battery cell with capacity equal to a recharge fraction (RCF) amount of the amount of discharging capacity, determining an undercharge condition of the battery cell when the VEOD went below a low trigger level (VHigh) during the discharging and the VCOE stayed below a high trigger level (VHigh) during the recharging, increasing the RCF for a next cycle of the recharge cycle when in an undercharge condition, determining an undercharge condition of the battery cell when the VEOC went above VHigh during the recharging and the VCOD stayed above the VLow) during the discharging, decreasing the RCF for a next cycle of the recharge cycle when in an overcharge condition, determining a degraded condition of the battery cell when the VEOC went above VHigh during the recharging and VEOD went above VLow during the discharging, increasing the VHigh and decreasing VLow when in the degraded condition serving to increase a trigger range (DVT) being a difference between VHigh and VLow (DVT=VHigh-VLow), determining a normal condition of the battery cell when VEOC stayed below VHigh during recharging and VEOD stayed above VLow during discharging, and adjusting the RCF to center a voltage range being a difference between VEOC to VCOD within the trigger range.

2. The method of claim 1 wherein VEOC is equal to a highest voltage charge level of the battery cell during the recharging of the battery cell.

3. The method of claim 1 wherein VEOC is equal to a lowest voltage charge level of the battery cell during the discharging of the battery cell.

4. The method of claim 1 wherein, the increasing the RCF step increases the RCF by a predetermined recharge fraction adjustment (ΔRCF), and the decreasing the RCF step decreases the RCF by ΔRCF.

5. The method of claim 1 wherein, the battery cell has a maximum allowable voltage VMax and a minimum allowable voltage VMin, and the increasing the VHigh and decreasing VLow step increases VHigh by a predetermined trigger level adjustment Δ% times the difference between VMax and VHigh (VHigh=VHigh+Δ%(VMax-VHigh)) and decreases VLow by Δ% times the difference between VLow-VMin (VLow=VLow-Δ%(VLow-VMin).

6. The method of claim 1, wherein the adjusting the RCF step to center the trigger range comprises the steps of, determining a current recharge range (DVC) for the current recharge cycle, DVC being the difference between VEOC and VEOD (DVC=VEOC-VEOD), DVC becoming a previous recharge range DVP during a next recharge cycle of the recharge cycles, determining when DVC is greater than DVP indicating an increasing recharge range, decreasing the RCF during normal condition in the presence of the increasing recharge range, determining when DVC is lesser than DVP indicating a decreasing recharge range, and increasing the RCF during normal condition in the presence of the decreasing recharge range.

7. The method of claim 1, wherein the adjusting the RCF step to center the trigger range (DVT) comprises the steps of, determining a current recharge range (DVC) for the current recharge cycle, DVC being the difference between VEOC and VEOD (DVC=VEOC-VEOD), DVC becoming a previous recharge range DVP during a next recharge cycle of the recharge cycles, determining a decreasing recharge range condition when DVC is lesser than DVP and when a high voltage margin (VH) being a difference between VHigh and VEOC (VH=VHigh−VEOC) is greater than a low voltage margin (VL) being a difference between VEOD and VLow (VL=VEOD−VLow), determining an increasing recharge range condition when DVC is greater than DVP and when VH is lesser than VL, decreasing the RCF during the normal condition and in the increasing recharge range condition, and increasing the RCF during the normal condition and in the decreasing recharge range condition.

8. The method of claim 7 wherein the increasing the RCF step during the normal condition comprises the steps of, determining a recharge fraction adjustment portion ΔF of a predetermined recharge fraction adjustment ΔRCF, and increasing the RCF by ΔF times ΔRCF, (RCF=RCF+(ΔFxΔRCF)), where ΔF is a positive value.

9. The method of claim 7 wherein the decreasing the RCF step during the normal condition comprises the steps of, determining a recharge fraction adjustment portion ΔF of a predetermined recharge fraction adjustment ΔRCF, and decreasing the RCF by ΔF times ΔRCF, (RCF=RCF+(ΔFxΔRCF)), where ΔF is a negative value.

10. The method of claim 7 wherein the increasing the RCF step during the normal condition comprises the steps of, determining a recharge fraction adjustment portion ΔF of a predetermined recharge fraction adjustment ΔRCF, the ΔF is equal to a scalar gain (G) times the difference between VH and VL and times a ratio of the trigger range DVT minus VH divided by DVT (ΔF=G(VH−VL) ((DVT−VL)/DVT)), and decreasing the RCF by ΔF times ΔRCF, (RCF=RCF+(ΔFxΔRCF)), where ΔF is a positive value.

11. The method of claim 7 wherein the decreasing the RCF step during the normal condition comprises the steps of, determining a recharge fraction adjustment portion ΔF of a predetermined recharge fraction adjustment ΔRCF, the ΔF is equal to a scalar gain (G) times the difference between VH and VL and times a ratio of the trigger range DVT minus VL divided by DVT (ΔF=G(VH−VL) ((DVT−VL)/DVT)), and decreasing the RCF by ΔF times ΔRCF, (RCF=RCF+(ΔFxΔRCF)), where ΔF is a negative value.

* * * * *